US007181474B2

(12) United States Patent
Asherman (10) Patent No.: US 7,181,474 B2
(45) Date of Patent: Feb. 20, 2007

(54) DATABASE COMMUNICATION SYSTEM AND METHOD FOR COMMUNICATING WITH A DATABASE

(75) Inventor: Steven Asherman, New York, NY (US)

(73) Assignee: Base One International Corp., New York, NY (US)

( * ) Notice: Subject to any disclaimer, the term of this patent is extended or adjusted under 35 U.S.C. 154(b) by 471 days.

(21) Appl. No.: 10/793,113

(22) Filed: Mar. 4, 2004

(65) Prior Publication Data

US 2004/0172397 A1   Sep. 2, 2004

Related U.S. Application Data

(62) Division of application No. 09/725,597, filed on Nov. 29, 2000, now Pat. No. 6,738,775.

(60) Provisional application No. 60/168,107, filed on Nov. 30, 1999.

(51) Int. Cl.
G06F 17/30 (2006.01)

(52) U.S. Cl. .................... 707/202; 707/104.1

(58) Field of Classification Search ............ 707/8, 707/3, 100, 202, 204, 9, 10, 1, 103 R, 200, 707/104.1; 719/313; 714/15
See application file for complete search history.

(56) References Cited

U.S. PATENT DOCUMENTS 5,465,328 A * 11/1995 Dievendorff et al. ......... 714/15

OTHER PUBLICATIONS

Haskin et al., Recovery Management in QuickSilver, 1998 ACM, pp. 82-108.*

* cited by examiner

Primary Examiner—Apu M. Mofiz
(74) Attorney, Agent, or Firm—Day Pitney LLP (57) ABSTRACT

A computer system includes one or more local users and one or more remote users. Each of the local users and remote users communicate with a database via respective telecommunications lines and/or an intermediate computer network. All calls to the database in a transaction between the local or remote user and the database are packaged into a single communication between the user and the database. The results are similarly packaged and communicated back to the user.

13 Claims, 5 Drawing Sheets

Batch Job Status Transitions

Figure 6

DATABASE COMMUNICATION SYSTEM AND METHOD FOR COMMUNICATING WITH A DATABASE

This application is a divisional of patent application Ser. No. 09/725,597 filed on Nov. 29, 2000 now U.S. Pat. No. 6,738,775 which claims priority from provisional U.S. patent application Ser. No. 60/168,107 filed on Nov. 30, 1999.

BACKGROUND OF THE INVENTION

1. Field of the Invention

The present invention relates generally to computer system that includes a database communication system and a method for communicating with a database. More particularly, the present invention relates to computer system and its associated software for accessing data stored in a database wherein the database may be located either remotely or locally from the user's computing device executing such software. The present invention also operates independently of database type.

2. Description of the Prior Art

It is well known in the art to use computer software to access data, which is stored in a database locally on, for example, the hard disk of a personal computer or on removable media, such as an optical disk. Such software typically makes numerous calls to the database in performing any transaction therewith. When accessing the database locally, i.e., on the same device that is executing the software or on a local area network ("LAN"), such numerous calls present little or no problem. However, when the device executing the software is located remotely from the database, for example, when the database is stored on a remote device and accessed via the Internet, a myriad of problems arise.

One such problem is the limited bandwidth available to the average user, who connects his personal computer to the Internet via a dial-up connection, i.e., via a modem.

An additional problem with the conventional method of accessing a database via the Internet stems from the use of "browser" software. Browser software may be appropriate for use in, for example, web navigation, consumer transactions, information retrieval and dissemination, and help and documentation systems. However, software for business applications, such as in the banking, insurance, securities and accounting disciplines, based on a browser model are generally inadequate in several respects. For developers authoring such business applications, the browser model adds a level of complexity to the authoring process. Generally, the browser model is based on transmitting raw data in addition to graphics files and programming instructions necessary for displaying such data and graphics files. However, for large, complex business-oriented applications, it is highly inefficient to transfer program code other than for an initial installation or subsequent application upgrade. As the use of the Internet increases and as Internet applications become increasingly complex, minimizing unnecessary traffic across the network will be critical for achieving maximum performance. Finally, current efforts to develop ever more sophisticated browser software, plug-in components and the like tend to create instabilities and compatibility problems.

There are numerous benefits gained by storing data locally and accessing the same without resort to Internet communication. One benefit is the execution speed and communication speed achieved.

One example of a business application ideally suited for data storage at a location remote from the user's location and access of the database over the Internet is a so-called "e-commerce", or Internet shopping, system. The data stored and accessed in such a system would include, for example, product descriptions, product pictures, video clips, audio files, cross-reference information and current pricing. The database may further include customer records and accounts, prior purchase data, inventory records and order tracking. It is not uncommon, however, for a substantial amount of this data to be static, that is, unchanging over time or changing only occasionally. Such static data may be product descriptions and product pictures. A relatively small amount of data changes dynamically over time. Such dynamic data would include up-to-date pricing and inventory status. Given that available bandwidth is usually insufficient for instantaneous performance, it would be beneficial to store the static data, which does not require frequent updating, locally, relative to the end user, and to store the dynamic data, which would require frequent and/or real-time updating, remotely, relative to the end user. Thus, an end user accessing the database would retrieve a significant majority of the data from a local source, without resorting to Internet communication, while retrieving a very minor portion through the Internet. Clearly, the user would attain a substantial performance advantage over a user accessing all data via the Internet.

SUMMARY OF THE INVENTION

The present invention relates to a computer system and method, wherein database transactions are processed by packaging an entire transaction request, including all of the database calls necessary for performing the transaction, into a single communication. The results of the transaction are similarly packaged into a single communication and transmitted back to the user. Additionally, often a large portion of the database is stored locally, such as on a CD-ROM or hard drive, and only the dynamic portion of the database, such as updates, accessed remotely. Additionally, the CD-ROM could be periodically updated by a new CD-ROM or larger changes to the database could be accessed on-line at off-peak hours for extended periods.

With the use of this product, a corporation, for instance, can create a highly graphical e-commerce site that performs well over regular, slow telephone connections to the internet. The software which is employed by the client or end-user is typically Windows® based (or similar local operating system), but does not run in an internet browser. Rather the client or end-user software includes a full-featured custom Windows® application that goes directly to the standardized, build-in communication features of the local operating system. The application connects to the internet (and therethrough to the corporation's internet servers and databases) through the same low-level communication and networking services used by the web browser and e-mail software. Typically, the client software is delivered by storage media such as a CD-ROM or network file transfer so that the user has local access to large portion of the static database and the program resides on the client machine. The installation would require only copying files to a single directory on the user's hard drive and setting a maximum amount of space for local caching.

Additionally, the software of the present invention, by avoiding browser software, avoids inefficient layers of processing and further avoids the expense of generating an interpreting complex HTML. The software of the present invention is therefore able to go directly to the desired data via low-level protocols (such as TCP/IP) that are at the heart of the internet.

Similarly, the present invention uses several types of buffering, managed automatically on both the client and the server, which dramatically reduce network activity and database contention in large multi-user applications.

DETAILED DESCRIPTION OF THE PREFERRED EMBODIMENTS

Those skilled in the art will gain an appreciation of the present invention when viewed in conjunction with the accompanying drawings. The individual reference characters designate the same or similar elements throughout the several drawings.

Figure 1:
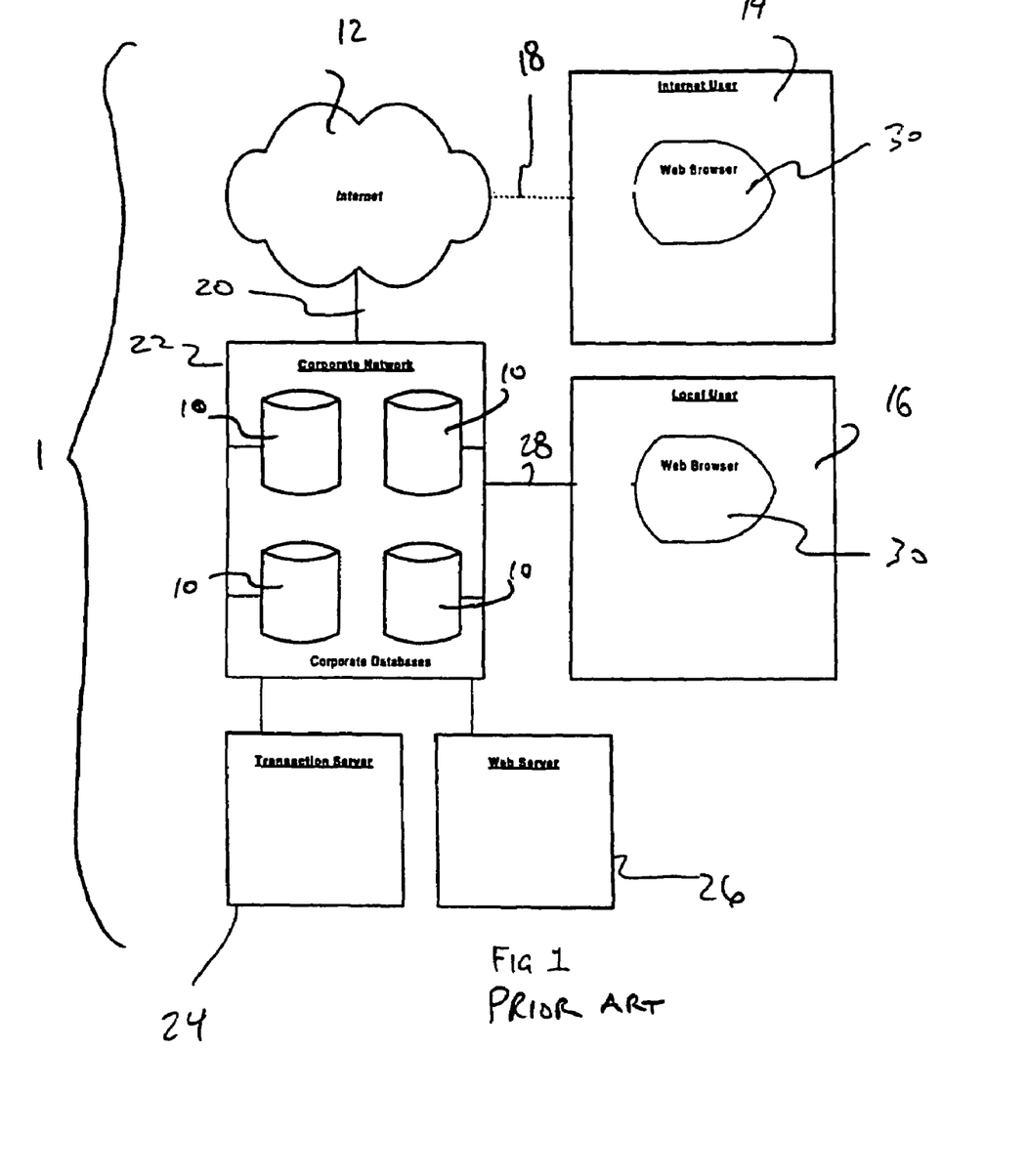
FIG. 1 is a schematic view of a prior art computer system for accessing a remote database.

Referring to FIG. 1, there is seen a computer system 1 for accessing data contained on one or more remote databases. The computer system 1 may include one or more Internet users 14 and one or more local users 16. The Internet user 14 connects to the Internet 12 via telecommunications line IS by, for example, a modem. The databases 10 may be connected to each other across a corporate network 22 of the database publisher. This corporate network 22 is also connected to the Internet through telecommunications line 20. Connected to the corporate network 22 are devices, such as a transaction server 24 and Web server 26, for processing transactions between the databases 10 and the Internet user 14. Local user 16 is connected with the corporate network 22 via telecommunications line 28, which may be, for example, an Ethernet connection. All communication between local user 16 and the databases 10 occurs through telecommunications line 28, and all communication between Internet user 14 and the databases 10 occurs through telecommunications line 20, the Internet 12 and telecommunications line 18. The local user 16 and the Internet user 14 each utilize a Web browser 30 to communicate with the databases 10. As a result, the Web server 26 must respond to the local user 16 or Internet user 14 with a Web page. The Web page is then transmitted from the Web server 26 through the corporate network 22 and then to the local user 16 via telecommunication line 28 or to the Internet user 14 via telecommunications line 20 to the Internet 12 and then through telecommunications line 18. One significant drawback with the computer system 1 described above is the processing necessary for the Web server 26 to respond to a transaction with the Internet user 14 or the local user 16. Another drawback with the computer system 1 is the bandwidth necessary to communicate between the Internet user 14 or the local user 16 and the databases 10, particularly in view of the communication being in the form of Web pages and HTML code.

Figure 2:
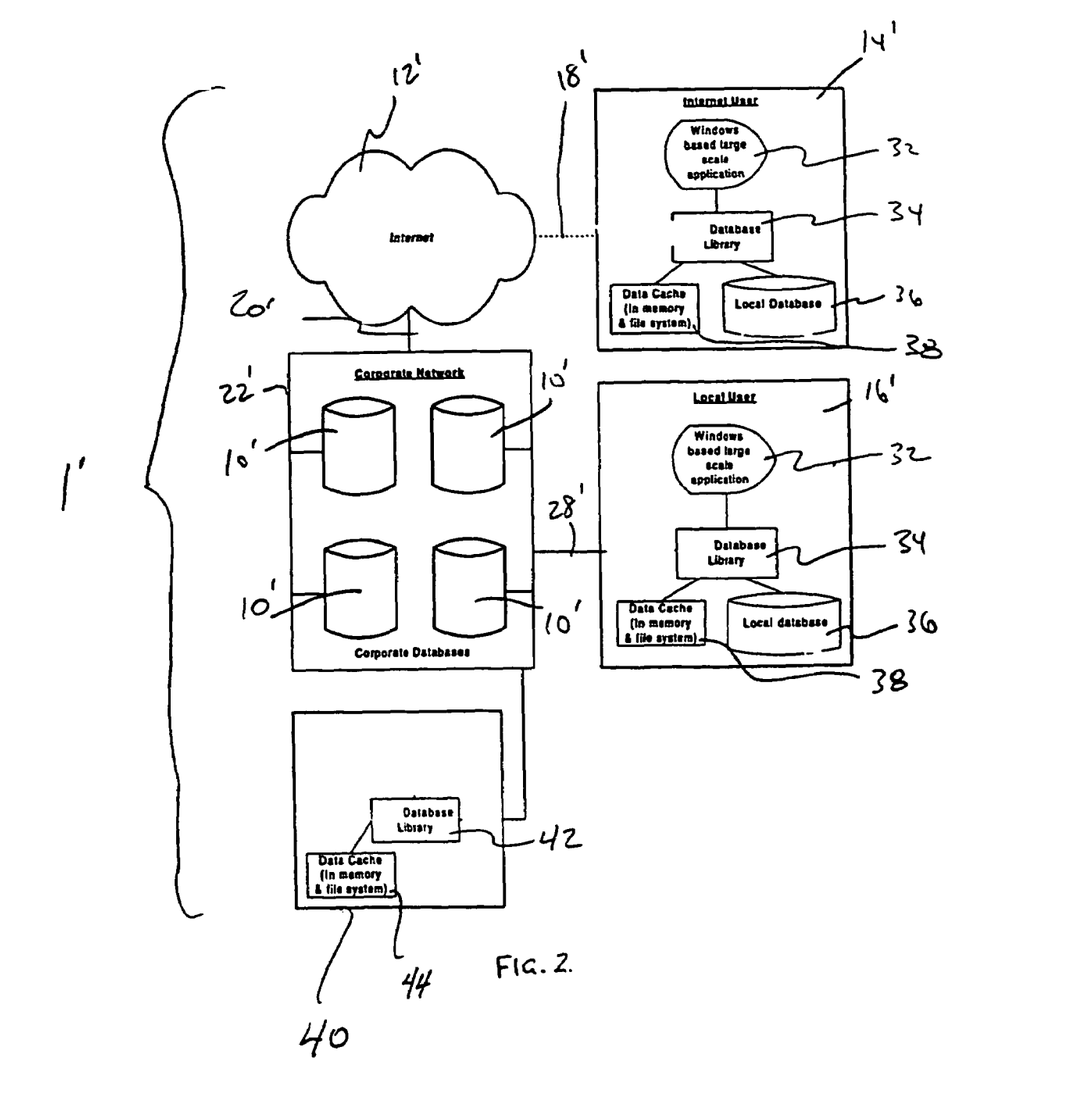
FIG. 2 is a schematic view of a computer system according to the present invention for accessing a remote database.

Referring now to FIG. 2, there is seen a computer system 1 of the present invention. Like parts are noted with an accompanying prime. As in the computer system 1 illustrated in FIG. 1, the computer system 1 of the present invention as illustrated in FIG. 2 includes an Internet user 14' and a local user 16', each of which communicating with the databases 10' via the corporate network 22'. The Internet user 14' communicates with the corporate network 22', and the databases 10', through telecommunications line 18', which connects the Internet user 14' to the Internet 12', and telecommunications line 20', which connects the corporate network 22' with the Internet 12'. Similarly, the local user 16' communicates with the corporate network 22' and the databases 10' via telecommunications line 28'. However, unlike the computer system I shown in FIG. 1, the Internet user 14' and the local user 16' each communicate with the databases 10', not through a Web browser, but, rather, through a large-scale application 32. Large-scale application 32 is not an HTML-based browser or Web client. Rather, large-scale application 32, in the preferred embodiment described herein, is a Windows-based application, which communicates with the database 10' over the telecommunications lines and/or the Internet via a TCP/IP connection. The large scale application 32 accomplishes this communication by making calls to a database library 34, which processes the outgoing communication from the Internet user 14' or local user 16' to the databases 10' as well as the incoming communication from the databases 10' to the Internet user 14' or the local user 16'. The large scale application 32, through database library 34, may alternatively process transactions or communications with a local database 36 and/or with a data cache 38, which would be stored locally relative to the Internet user 14' or local user 16'. One function of the large scale application 32 and database library 34 is to package the entire transaction processing request, which may comprise a number of individual database calls, into a single communication, which is then transmitted from the Internet user 14' or local user 16' to the database server 40, which resides on the corporate network 22'. The single communication transmitted from the user 14', 16' to the database server 40 is then "unpackaged" and processed by database server 40. Because the large-scale application 32 is not based on a browser model, the single communication from the Internet user 14' or the local user 16' to the databases 10' is not burdened by the overhead necessary in HTML-based communication.

Instead of passing pages of HTML (a verbose, standardized, easily decipherable form of information) across the Internet, an application running with the present invention exchanges typically only compact packets of raw data with a server.

An application running with the present invention typically can efficiently add further security via an encryption/decryption and compression/decompression API. This means that any application of the present invention typically can be easily adapted to use its own proprietary method of encoding Internet transmissions, with no dependence on "Secure Sockets" or any other publicly known standards.

Another way the architecture of the present invention typically enhances security is by enabling efficient implementation of flexible extensions to the rudimentary access controls in commercial database products. Because a substantial amount of validation is done on the client side of the Database library, there is an additional layer of security rules possible without burdening the server or generating extra network traffic. Intelligent buffering of the Data Dictionary contributes even more to the efficiency of this approach.

As the architecture of the present invention typically separates the administrative interface from the underlying Database library, user and group-level security features can be leveraged across both 2 and 3-tier applications (without or with the Internet Server). This makes it possible for the same administrative and security components and interface to be used in Internet-enabled applications and web sites as in local network client/server environments.

The database server 40 includes its own database library 42 and data cache 44. The database server 40 responds to a request by the Internet user 14' or the local 16' by packaging the results of the transaction into a single communication, which, like the request, is not burdened by the overhead of an HTML-based Web communication. Furthermore, the computer system does not require a Web server to process and deliver a Web page to transmit back to the Internet user 14' or the local user 16' the results of the transaction request.

From a programming standpoint, the software developer is not required at design time to know the ultimate location of the database, i.e. either local or remote relative to the end user. Preferably, the programmer need only identify the location, by, for example, the IP address, of the device on which the database resides by a setting in an initialization file. The large-scale application 32 may be programmed so that transaction looks to both the local database 36 as well as the databases 10' residing on the corporate network 22. This would be preferable when, for example, the computer system 1' is used as the basis for an e-commerce system. In such a system, the local database 36 would preferably store the static data, such as product descriptions and the databases 10' would store the dynamic data, such as pricing and availability data. Thus, only the relatively small quantity of data that is dynamic would be transmitted from the databases 10' to either an Internet user 14' or local user 16', thereby significantly lowering the data transmitted via the telecommunications line 28', in the case of a local user 16', or via the telecommunications lines 18', 20' and the Internet 12', in the case of an Internet user 14'.

Figure 3:
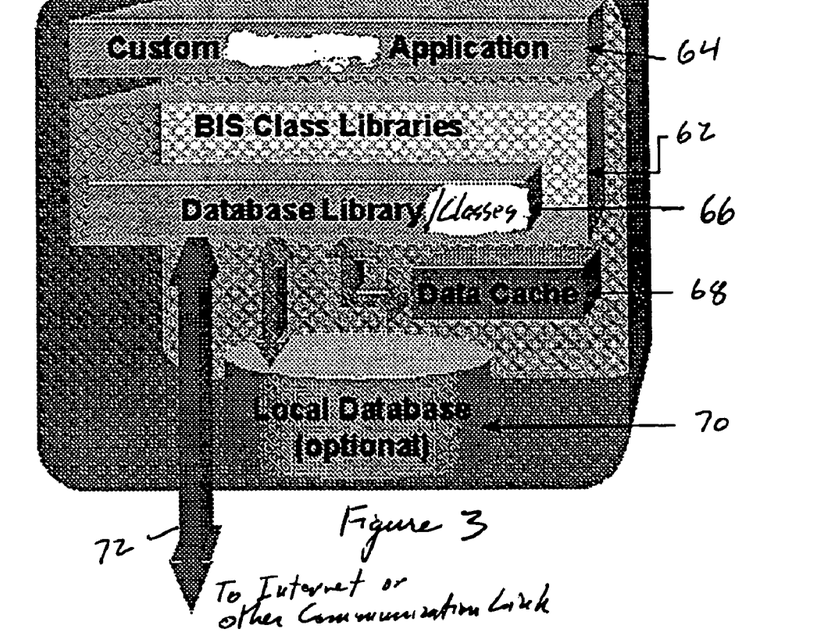
FIG. 3 is a conceptual schematic of an application program according to the present invention.

Referring to FIG. 3, one sees a conceptual schematic of the environment 60 of a client or user application program of the present invention. Class library 62 provides an application framework for building applications on Windows® or similar platforms. The custom application program 64 is built from components from class library 62. Database library/classes 66 are defined in order to readily access the data, wherever it resides, and further allows for simple revision of database locations. Database library/classes 66 can be in communication with data cache 68, which is provided in memory and file systems and which speeds processing by reducing the need for database access (both local and remote); local database 70 (optional); and remote databases via internet or other communication link 72.

Figure 4:
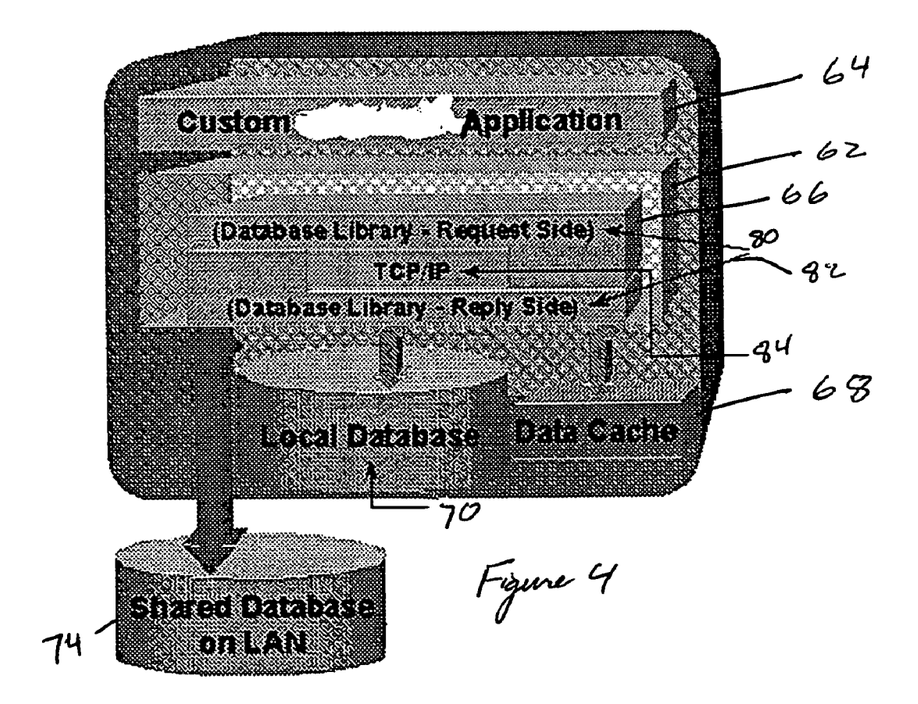
FIG. 4 is a conceptual schematic of a one-tier and two-tier application program according to the present invention.

FIG. 4 illustrates one-tier (stand-alone user accessing local database 70) and two-tier (client/server with shared database 74 on a LAN) configurations. Whereas the database library/classes 66 includes database library request side 80, database library reply side 82 and TCP/IP module 84, the TCP/IP module 84 is unused in the one-tier and two-tier configurations because the Internet is not involved. Likewise, the database library request side 82 and database library reply side 84 operate as a single unit in these configurations. As stated above, the two-tier application involves communication across a LAN to an external database server, but this requires no programming changes from the one-tier stand-alone configuration.

Figure 5:
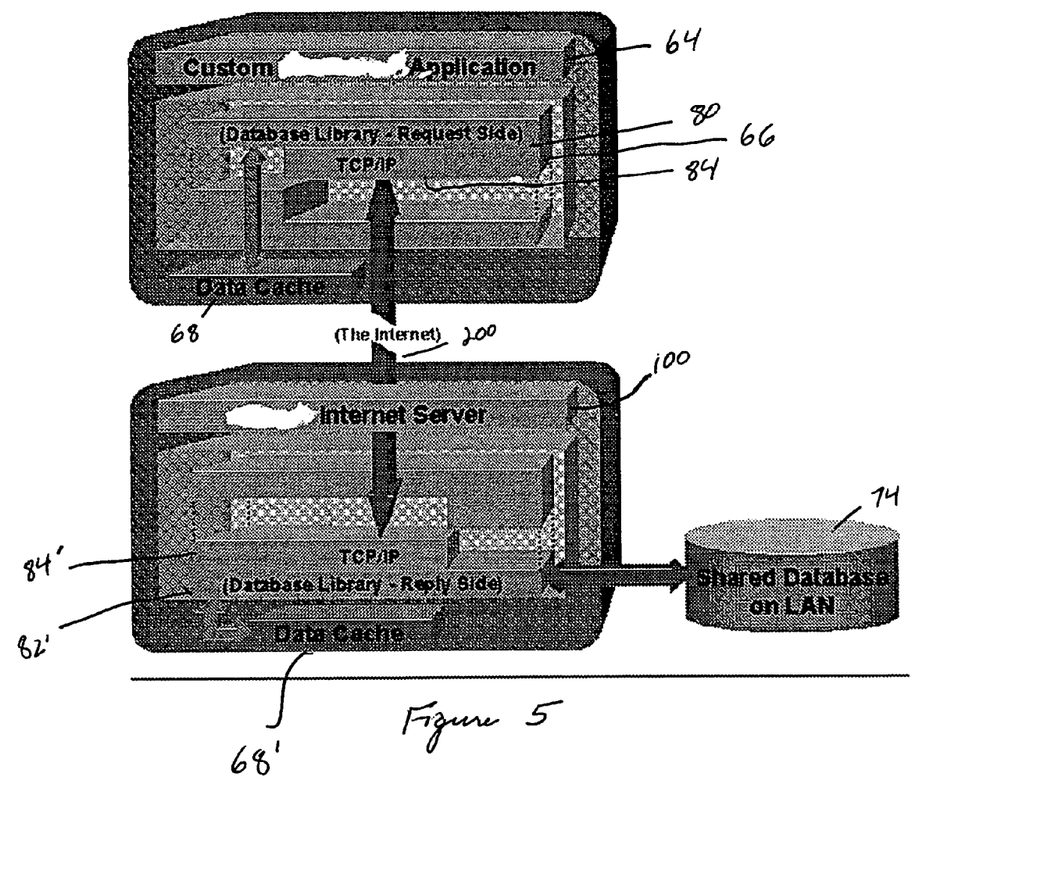
FIG. 5 is a conceptual schematic of a three-tier application program according to the present invention.

FIG. 5 illustrates a three-tier application wherein TCP/IP module 84 of custom application program 64 communicates with TCP/IP module 84 of server 100 over internet 200 whereby database library request side 80 of custom application program 64 communicates with database library reply side 82' of server 100 thereby communicating with database 74.

A command processor is used which runs command files (or scripts) that can include commands from different platforms or programs (such as SQL, DOS or Windows®) plus specialized commands for loading and unloading large databases. The command processor can be used across the internet, without the inefficiency and limitations of trying to administer through "screen scraping" remote control and database vendor supplied utilities. Command files can be used for performing most actions against the database, and are especially useful for storing sequences of commands that are executed repeatedly. A command file is a reusable, editable text file that is easy to read and understand. Nested command files and comments are supported. The command processor provides for automatically creating a database from scratch, that is from the back-end independent data dictionary. The command processor supports commands which can be used for database creation instead of using hard-coded commands. This eliminates the need for extensive command files for creating tables. The command processor further includes commands for granting rights to particular record types or regions to individual users and groups of users.

The database manager class provides the main functions for operating on databases as a hole, as well as a variety of other useful functions. For example, the open database function prepares a specific database for use and must be called before data can be stored to or retrieved from the database. If the database is across the internet, the "set internet server" command must be called before opening the database. The present invention typically simplifies interacting by using the concept of a current database. While multiple databases can be open, only one database can be current, and all actions take place against the current database. Of course, one can switch the current database between the various open databases.

There are several kinds of database buffers—a record database buffers, three kinds of sets, a key buffer and a buffer for stored procedures. A "set" is one or more records or rows of data. Database buffer classes represent area of the client workstation's main memory used to receive and transmit data from the database. A record database buffer class can contain only one record at a time, whereas a set database buffer class can contain more than one record.

The set base class and the scroll cache set base class are used for getting multiple records at a time. The scroll cache makes extensive use of the database index dictionary.

Scroll cache is very efficient for large, multi-user applications. Scroll cache releases all locks as soon as its buffer is full, which increases concurrency between multiple users. Scroll cache automatically constructs and executes a new query when additional data outside of the contents of the local cache is needed to fulfill a scroll request.

The Scroll Cache Set represents an area of main memory for receiving a set of records or a part or all of a query result. A scroll cache set is a read-only database buffer designed to provide high efficiency scrolling of data by retrieving a batch of records at a time and caching them locally on the client machine.

Scroll Cache supports scrolling forwards and backwards. It is efficient for moving back and forth a record at a time and a page at a time, as well as for going to the last record and the first one.

Scroll Cache is significantly more efficient than traditional queries for large, multi-user applications. Scroll cache releases all locks as soon as its buffer is full, which increases concurrency between multiple users. Scroll cache automatically constructs and executes a new query when additional data (outside of what is in the local cache) is needed to fulfill a scroll request.

Moreover, Scroll Cache limits the sort order of the result set that may be requested to orderings which can be generated quickly. Scroll cache automatically forces index searches and prevents sorts, the single most important cause of poor performance in large database applications.

Programmers can refresh the cache and automatically repositioning it after a modification has been done. Efficient searches are done by first searching the contents of the cache before forcing a query to be done against the database. The search looks in the cache first, then does a query (which returns a set of records from the database) only if a query is needed. This is especially efficient for simple readjustments of position within a set, such as moving to the next or previous records.

A scroll cache set requires an ordering, and this sort order must be based on an index. For a sort key to be valid, it must:
1) be a unique index key of the base record type (table)
2) include all fields that comprise the index
3) have all key fields in ascending order
4) not include column numbers (i.e. must use Database Field Names)
5) be an entry in the Database Index Dictionary
6) include only retrieved field(s) (i.e. every OrderBy field must be present in the set buffer layout, so that all parts of a multi-field key are available.)

The database buffer class represents an area of main memory of the local user used for retrieving data from and transmitting data to a database. The record base class is one of the database buffers used to hold a single record (row). The set classes are database buffers for holding multiple records. The key base class is a specialized database buffer used for holding an index key. The procedure base class is used for running stored procedures.

More particularly, the record base class represents an area of main memory for receiving records from and sending records to a database. It operates on one record at a time, and can add, change or delete a record, as well as set data in record fields, set an attached object or clear the record buffer. To reduce network traffic and load on the database server, the record class tries to operate locally, that is, on the client, whenever possible. For example, data validation is done from the local dictionary cache rather than sending invalid data to the back-end. Similarly, if a record addition is attempted on an empty record buffer or a record change is attempted on unmodified data, the client rejects the operation rather than ask the database server to detect an invalid add or change.

For improved performance, a record buffer can be reserved for a single operation to be performed repeatedly. Then, the database command associated with this record buffer will be specially prepared for efficient repetitive invocation.

The database field value class is a generic class for holding and converting the values of database fields. The database field types supports are any other type than binary or memo, which are attached objects (described hereinafter). Therefore, this class can hold character, numeric, date and time data.

The database field mask class is used to format data according to the supplied mask (which is typically stored locally rather than with the communication of the database values). The database field types supported are those other than binary or memo, which are attached objects. Therefore, character, numeric, data and time data can be formatted using this class.

Database manipulation commands include open database, add a record, change a record, delete a record, get a record from a database, get a set of records from a database and choose a set class for querying.

The database library includes a database dictionary which is locally cached and can be used to define a database buffer. This assures that the database receives only valid information so that the user does not have to wait for the completion of communication to a database (which may be remote) to get the incorrect format information rejected. The database library maintains a complete description of record layouts, field descriptions, indexing information and other useful application "metadata". This insures efficient data access, especially with regard to utilization of indices; partitioning of the database into both logical and physical regions; specification of validation criteria and referential constraints to be automatically enforced; support for automatic database creation with dynamic storage allocation parameters; and pre-defined record types for support of screen definitions, security features, attached objects, batch processing and the help system. Programmers can use the automated database creation capability during development to build tables, indices, referential constraint and storage allocation parameters. When the application goes into production, the data dictionary gives the database administrator useful tools for managing the database structure.

The administration of the system simplifies assigning security privileges and setting security rules. Every user belongs to a User Group and a Security Group, which has a set of associated Security Rules, so the system provide two separate methods of grouping and controlling users. Typically, the combination of the user group and the security group determines what access and actions are available to the user.

Database Session Control is a behind-the-scenes facility that assists in preventing multiple logons for the same User ID. This makes it practical to sell User IDs for Internet database applications and price by the number of users (either total users or contemporaneous users).

Database Session Control includes registering who is logged on to the database and through what application or web site. Because Database Session Control makes it possible to efficiently track activity by User IDs that correspond to individuals, auditability and therefore security are also improved.

Database Session Control improves performance by preventing individual users from grabbing more than their share of computing power by logging on multiple times. (Users who need to have multiple, simultaneous processes doing modification can use the batch system.) More importantly, guaranteed unique keys can be generated efficiently by a client application, because the keys can include a code (User Code) for that user (User ID), with no chance some other client will produce the same code. Thus, the LastModKey produced by a client application should not be rejected by the database server because it turned out some other client just created the same (supposedly) unique index key.

As in other facilities with architecture of the present invention, the underlying implementation typically uses built-in record types (tables). Database Session records track who is logged on, through what application and Internet Server. These records are used to prevent multiple logons to the database by the same user.

There is one Database Session record per logged on user. Each record includes a User ID, a Logon Date and Time, Application Name (i.e. what executable or web site), and Application Version (e.g. '2.1'). By displaying these records, administrators can view a list of all the users and applications logged on to the current database.

OpenDb( ) adds the Database Session record for the current user, which is removed by the ClosDb( ) call done either as part of normal or abnormal application termination.

EndDatabase Session( ) cleans up remnants of a database session when there was a severe crash (not trapped by the abnormal termination handling) instead of a normal ClosDb operation. EndDbSession( ) connects to the database for the sole purpose of removing the leftover Database Session record and then disconnects.

The Internet Server maintains an internal list in memory of Database Sessions, which is used to solve the difficult problem of how to force off users efficiently. Most commercial database systems do not provide a programmer's interface for forcing off a user or even directly querying about who's already logged on. So, two-tier, client/server applications can't efficiently enforce unique logons, even when they add a Database Session record for each user. There is no efficient way to tell if the duplicate user detected because a Database Session record already exists comes from a previously crashed instance that left a dead Database Session record hanging around. (In two-tier, there is no application layer in between the client and the database to receive and act on a message to force off a particular client.)

The Internet Server provides a middle tier that makes it possible for one computer process to force off a different computer process (because, for example, they are both attempting to use the same User ID). The Internet Server is responsible for communicating between different servers to insure that a user can be forced off regardless of the machine handling the session. When it comes to preventing multiple logons by the same user, using the Internet Server as a middle tier provides a practical solution for both applications of the present invention and web-based applications.

The Database Session record includes addressing information identifying the Internet Server through which a user is coming. So a target Internet Server can be located from the Database Session record containing a duplicate User ID. This allows one Internet Server to provide the service of sending a message to a different Internet Server that instructs it either to terminate processing immediately for that user or to set a flag to terminate processing the next time there is any activity from that user (as in a web request).

Database Access Control provides a way for administrators to force users to log off, restrict users from logging on, and broadcast warning and informational messages. The administrator can control access to the database by using a connection across the Internet or through a local network.

The main purpose of Database Access Control is to allow applications and web sites to be shut down gracefully by the system administrator to perform tasks such as system maintenance, system upgrade, bulk upload/download of data, etc. To assist with such tasks, the Database Access Control mechanism provides a way to force off all the currently logged on users so that the system can be shut down and taken over exclusively by the system administrator to perform important but disruptive operations.

As in most architecture of the present invention, the underlying implementation is typically based on built-in record types (tables). Database Access Control information is maintained in the Database Access Control record (DbAccCtr). Every database has a single Database Access Control record.

A typical application of the present invention periodically checks to see if the Database Access Control record indicates that users should be prevented from logging on or should be forced off. The amount of time between checks is the Application Checkin Time (AppCheckinTimMinutes). The Application Checkin Time is stored in the Database Access Control record and can be set by the administrator. The Application Checkin Time is also used by the Batch subsystem to determine when a batch machine (user) should check for batch jobs to run.

Changing the Application Checkin Time in the Database Access Control record does not necessarily effect currently logged on users. It is sufficient for programs to pick up this information at logon (OpenDb) time.

The Database Access Control facility is NOT intended for instant messaging or instant forced logoff. There is a lag time before the actions take place. Only preventing logon takes place immediately. Typically, in applications of the present invention, messages and forced logoff will not take place until Application Checkin Time (default of 5 minutes).

In web-browser based applications using architecture of the present invention, the user typically must initiate an action against the web server. So expect 5 to 10 minutes delay before most users have received a message or been forced off from the time the administrator uses the Database Access Control facility. For a user to be forced off or receive a message, he/she must make a server request. After about 20 to 25 minutes, every user will have received the message or been forced off or will have timed out (given the typical web application session time-out value).

Database Access Control includes mechanisms for preventing accidental or deliberate loss of access. The Bypass User ID (BypasUsrId) is the user who can log on even when the no-logon condition is true and who won't be forced off. The Bypass User is set automatically to the user who last modified the Database Access Control record. The Bypass User information comes from the user's logon information. (The user doesn't input this information.) Owner (who has User Code #1 reserved) always has the same rights as the Bypass User to log back on.

The warning message specified for broadcast is used as a reminder when either the Bypass User or Owner tries to log on and either no logons are permitted now or users are being forced off now. If the administrator elects either No Logons Permitted Now or Force Logout Now, then Broadcast Warning Now must be set AND a Warning Message must be supplied.

Because of the power of such low-level facilities, security may be a concern that justifies special treatment, beyond, for example, restricting permission to use Database Access Control to users belonging to a particular Security Group. Programmers can easily add encryption between the client application used by administrators and the Internet Server by linking in custom encryption and decryption call-back functions.

To shut applications and web sites down temporarily so that the database can be used exclusively by the system administrator, here are the steps that might be performed using the Database Access Control mechanism:

[1]. Inform all the users in advance about the time during which the system would become unavailable to the users. This is done by setting the WarnNowFlag and WarnMsg. Once the WarnNowFlag is set, all the users in the system would see the message contained in WarnMsg, once every AppCheckinTimMinutes. The WarnMsg should contain the details about when the system would become unavailable and for how long and can contain the reason for system shut down. Thus, the WarnMsg keeps the users informed and prompts them to save their work if any and log off the system before the scheduled time.

[2]. After setting ON the WarnNowFlag and the WarnMsg for some time, NoLogonFlag should be set to disallow any new login attempts. When a user tries to log on, the NoLogonMsg gets displayed citing the reason and informing the user to try logging on again after the maintenance work is done.

[3]. Finally the ForceOffFlag should be set to force off all the currently logged on users. When a user is forced off, NoLogonMsg gets displayed informing the users as to why they are forced off and prompting them to re-logon after the system becomes available.

Therefore, by performing the above three steps, the system administrative can take complete control of the system in a graceful manner. After completing the administrative task, the system administrator should turn OFF all the flags to make the system available to the users. The user (System Administrator) who changes the Database Access Control record is considered as the Bypass user. This Bypass user is always allowed to log on to the system and is never forced off.

The system further includes the ability to access attached objects, which are defined as pieces of data that are attached to a single record. Examples of attached objects are text memos, BLOBs (binary large objects), bitmap files, gif files, jpeg or similar photographic files, video or sound clip files, word processor documents, spreadsheets, etc. Moreover, the system supports a plurality of attached objects per record even if the underlying database system does not support a plurality of attached objects. The database subsystem automatically compresses most types of attached objects for transmission and storage, and uncompresses them on retrieval. An attached object is typically physically stored separately from the rest of the record, which typically contains the 22-byte "Attached Object ID". This ID is used to locate the object and includes the Last Modify User Code, Date and Time in character format.

Every attached object has an Attached Object Type, which identifies the type of data in the attached object. Information about each Attached Object Type, including its name, unique code and, if applicable, an OLE class ID, is stored in the Attached Object type build-in records.

The Database Field Dictionary entries for the record type (table) determines how many attached object fields a record has. For example, a personnel record may include one binary attached object field for holding a scanned-in resume, another binary attached object field for holding the employee's picture, and a memo attached object field for comments from the employee's supervisor.

Attached objects are typically not retrieved until required, and are retrieved separately from the record to which they are attached. The application programmer can specify that an attached object will be cached if it is likely to be accessed repeatedly and unlikely to be changed, but otherwise the attached object will not be cached in order to avoid large amounts of disk space being grabbed to cache the attached objects temporarily.

The system further supports batch processing, especially for large-scale, long-running database-intensive jobs, which is particularly useful for dedicated PCs which are not required for other purposes for a prolonged period of time (such as at night for some businesses).

Figure 6:
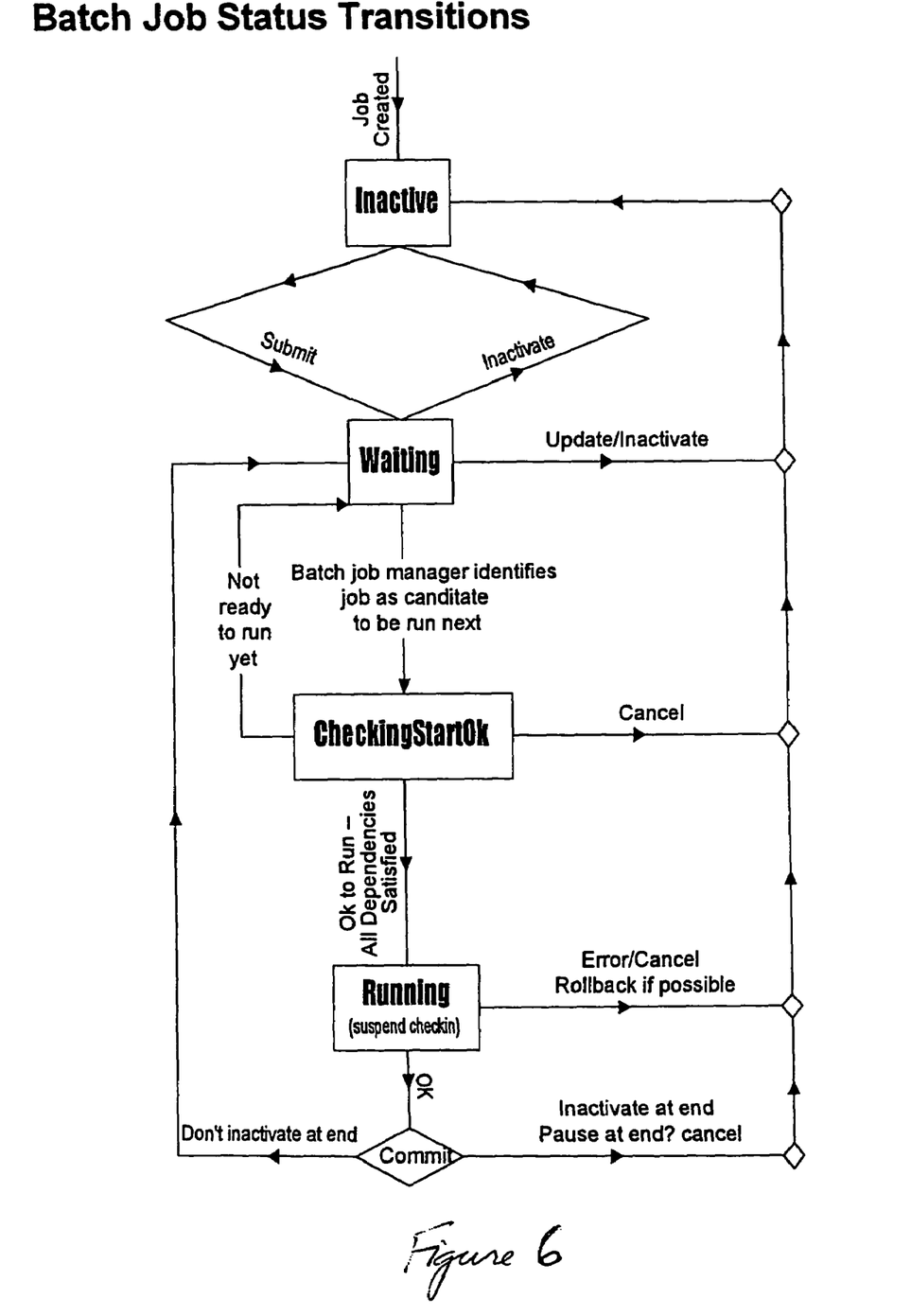
FIG. 6 is a flow chart of the batch aspect of the present invention.

FIG. 6 is a flow chart of the batch processing of the present invention. The user can use a connection across the internet to trigger a batch that is operating locally so that the user can submit and monitor high efficiency database jobs from a PC across the internet.

The Batch Facility allows for batch jobs to be run one at a time, in parallel on multiple machines, and sequentially in a series, depending on the job's run conditions, such as wait for a particular date or machine configuration. Only jobs in Waiting status are picked up by the job manager for processing. A job starts out in Inactive status and can be moved to Waiting status by the use of the Submit operation. Jobs can be moved out of Waiting status by use of the Inactivate operation.

Each batch job preferably always consists of a single BATCH FUNCTION. A batch function is a global C++ function written to follow a few simple processing conventions. A batch function should be written so that it never depends on any end user interaction. A dialog box that permits pausing or canceling is a useful addition, so long as end user interaction is optional.

A batch function takes two parameters, an optional Batch Parameter String to be used any way the function needs and the pointer to the Database Manager, so that all database functions are available (Open Database, Add & Change Record, Commit, etc.).

Programmers can write new batch functions and make them accessible to the batch job manager of their application. The batch functions, along with the batch job manager, are linked as part of the main executable. All batch functions take a null-terminated parameter string as an argument and return a completion code.

If a fatal error occurs during batch job execution, a batch function should throw an exception. The batch job manager will translate the exception to an error code which can be viewed on the Batch Master screen or in the log file. The batch function is responsible for logging any additional information to the log file. It is very important for batch functions to log detailed error information and to run without requiring operator input, since most batch functions will run when nobody is available to oversee them.

Each batch function is responsible for its own user interface. That might include a progress indicator or just a simple modal dialog box that informs an end user that the job is running and which allows the end user to cancel the job. An end user interface is not required.

The batch job manager exists to run batch jobs. Batch job manager processing includes:

No jobs are running; the batch job manager is inactive.

A batch user starts the batch job manager.

The batch job manager looks for work and if it finds a candidate, marks it with CheckingStartOk to prevent another batch job manager from also running the job.

The batch job manager runs any available job it finds to run; otherwise, it waits for application check-in time, then looks again.

At the end of running a job, the batch job manager sets the date and time for the job's next run, if a Period Type and Period Unit Count are set for the batch job. The Wait Date and Time, as well as the Wait Job Date and Time, are incremented by the specified period. If the resulting date(s) and time(s) are prior to the current date and time, incrementing is done repeatedly until the date(s) and time(s) are greater than or equal to the current date and time.

At the end of running a job, the batch job manager also sets the end-of-run fields in the batch job record, such as the completion code, any error code, and the time the job completed. In addition, if the batch function contains programmer defined end-of-run settings, these will also update the batch job record, so long as the job ended without error.

After running a job, if this is a manual batch user, the batch job manager becomes inactive; otherwise it looks for work.

If the conditions for running a batch job are specified, the job will be run as soon as the conditions are met. For example, Job 2 is submitted, and it is dependent on the successful completion of Job 1. If Job 1 was previously completed successfully, then Job 2 will be processed immediately.

If Job 1 can be executed periodically, then Job 2 should be made dependent not only on Job 1, but on the Wait Date as well. This will allow Job 2 to be run after Job 1 executed successfully today.

To create a dependency on one or more jobs, the batch job's Wait Job Date must have a value. If the Wait Job Time is blank, then midnight (00:00) is assumed. By adding Wait Job records, programmers and operators can add the wait job(s) to be associated with a particular batch job.

Both the WaitJobDate and Time and the WaitDate and Time can be set by a program function or by a human operator. First, to run a batch job, the current date and time must be greater than or equal to the WaitDate and Time. Second, the current date and time must be greater than or equal to the WaitJobDate and Time before the check is made to determine whether all "parent" jobs have both run and ended with the required completion codes. In addition, the Start Date & Time of every parent job (wait job) must be greater than or equal to the WaitJobDate and Time of the current job.

Transaction processing plays a key role in the database architecture of the present invention because it is crucial in coordinating multiple users doing data entry and in reliable recovery from hardware and software failures. The most important purpose of transaction processing is to insure that all database changes that are part of a single logical (business) transaction appear completely or not at all. Users must be prevented from doing a "dirty read" and seeing another process' in-flight transaction, which may subsequently fail.

A related objective of transaction processing is to make it possible to gather data in a single, consistent snapshot, which means, for example, that all data on a given report or screen actually existed together at the same point in time. Local storage or caching of data significantly speeds up response time, but must not conflict with the need to both know and control exactly how old some of that data is (Last Refresh Date/Time).

Programmers need transaction processing facilities to make sure they can easily and efficiently defend against the unexpected coincidences that take place when a number of users access on a database. Scroll Cache is an example of database architecture of the present invention that makes it simple to combine local data caching under transaction processing rigorousness. Another example is the Last Modification Key mechanism used to efficiently handle the problem of multiple users simultaneously trying to change or delete the same record. This use of transaction processing facilities is sometimes called "optimistic" concurrency control, because it is based on an assumption that, although important, such collisions are rare and that it is much more efficient to spot problems as they occur then "pessimistically" lock records the entire time a user is making changes.

The architecture of the present invention preferably automatically handles many of the details needed for efficient transaction processing. Relational database systems require an explicit COMMIT command to complete a transaction and an explicit ROLLBACK command to abort a failed transaction. Most data modification functions, such as AddRec( ), ChgRec( ), DelRec( ), AddSet( ), LoadRecs( ), provide automated handling of transaction processing. Some database functions include options which allow custom tailoring of transaction handling and others automatically handle releasing locks.

The objective is to improve performance, simplify programming and reduce the chance of transaction processing errors that may not show up until the application is put into production. For example, AddRec( ), ChgRec( ), DelRec( ) and AddSet( ) each have two optional parameters: CommitOnSuccessOption, which can have a value of COMMIT_Yes or COMMIT_No, and RollbackOnFailureOption, which can have a value of ROLLBACK_Yes or ROLLBACK_No.

When no parameters are supplied to these functions, the default is to immediately perform a database COMMIT if the operation is successful or a database ROLLBACK if the modification cannot be done for any reason. If ROLLBACK_Yes has been passed (the default), then any failure will cause rollback to take place automatically, without regard for the setting of CommitOnSuccessOption. (The only exception is for NoDataToAdd or Change completion codes, which does NOT cause a rollback and still causes a commit, if the COMMIT_Yes was specified.)

If ROLLBACK_NoOpt is specified, then failure will NOT cause a rollback and automatic handling will depend on the setting of CommitOnSuccessOption. (The only exception is if the failure is a severe, unrecoverable error, in which case rollback will be done automatically.)

If ROLLBACK_No and COMMIT_Yes are passed, then a failure will cause a COMMIT, if possible, to be done on prior work. LoadRecs( ), which is for adding records from a file, uses this option combination internally.

If both ROLLBACK_No and COMMIT_No were passed then NEITHER a commit nor rollback will take place after a failure. When COMMIT_No and ROLLBACK_No are used together, an explicit Commit or Rollback must be issued to terminate the in-flight transaction. As always, programmers must always commit or rollback as soon as possible to avoid adversely affecting other users of the database.

Combining the COMMIT_Yes and/or ROLLBACK_Yes with record modification functions is especially efficient for multi-tier and Internet architecture. This is because the database is not held up waiting for the client to issue a commit on success or rollback on failure.

The COMMIT_No/ROLLBACK_No combination prevents an automatic rollback from taking place when a record modification operation fails. This allows the programmer to control the choice of whether to issue a rollback or to commit the work already done.

The architecture of the present invention preferably uses optimistic concurrency control to coordinate multi-user access to the same records. Two users can retrieve the same record, but only one user at a time can alter it. If they both try to update it, the changes of the first user to save the record take effect. The second user's changes are rejected, and that user is notified that some other process has modified the record.

Every record has a LAST MOD KEY, which consists of 3 fields: a user code, a date, and a time. The Last Modified User Code identifies the user who added or last changed a given record. The User Code keeps hot spots from occurring; in effect each user is operating on a different portion of the last mod key index for that database, so contention to apply locks at the same spot is avoided.

The Last Modified Date is the "client" date, the date according to the user's machine. The Last Modified Time is the client time, to ten-thousandths of a second. The time is accurate to the second, and the positions to the right of the decimal point are approximately correct to the hundredth of a second, with further adjustments made automatically to guarantee that last mod keys are always unique.

The Last Mod Key provides genuinely useful audit and debugging info. Because all of its components are produced by the client, the Last Mod Key can be generated very efficiently.

Every record type (table) must have a LastModKey (last modification key) consisting of three fields: LogonUsrCod of user making last modification, Date of last modification, Time of last mod, down to ten-thousandths of a second is good enough.) These three fields may NOT be NULL and, must have a UNIQUE index built on them, which allows for high speed lookup. Thus, every LastModKey must be unique for its record type (table) and is actually unique within the whole database.

The Record Base Class (clsRecBase) has Add Record (AddRec), Change Record (ChgRec) and Delete Record (DelRec) member functions which use the LastModKey. These functions are always applied against a single record at a time. If successful, one record will be inserted, updated or deleted.

When a record is added in the present invention, applications preferably automatically fill in the LastModKey. When a record is changed, the LastModKey is automatically used to do a direct lookup. When the record is found and changed successfully, the new LastModKey is filled in. If the record is not found, it is because someone else has changed it or deleted it. If any other user has changed a record being updated or deleted, the ChgRec( ) or DelRec( ) operation will be unsuccessful, and an appropriate return code comes back. (In most instances, when the modification fails, the user should be notified that some other user has changed or deleted the current record, and the screen should be refreshed.)

To sum up, the requirements for a database for the present invention typically are:
1. There must be a last mod key in every record type;
2. There must be a data dictionary describing all the record types;
3. Every record type must have the same qualifier (that is, belong to the same schema, if the back-end uses schemas)
4. Indexes are required for search and scrolling functions that take advantage of high performance client-side caching.

The system further takes the concept of derivation to its ultimate conclusion with the concept of inheritance extended to include not just classes, but entire applications, including their database layout (predefined record layouts). That is, as previously stated, the data dictionary maintains a complete description of record layouts, file descriptions, indexing information, and other useful application "metadata". This, of course, drastically reduces the amount of data being transmitted during database accesses. In particular, formatting data can typically be eliminated from the communications during database accesses. Typically, an application uses the classes, resources and database command files of a foundation application as a base. Therefore, a subsequent application will also be derived from the foundation application. One can, in turn, derive an application from the subsequent application and override the base application's behavior to create an easy to maintain, custom tailored version.

The architecture of the present invention typically attempts to simplify the confusion between nulls and blanks in SQL. In the traditional relational model, a value is null if it is "unknown", and this must be distinguished, for example, from a value consisting of all blank characters.

In the architecture of the present invention, null typically means "blank"; a null field is a blank field. Nulls and blanks fields are treated as equivalent (to the extent possible given the underlying relational system). The relational definition of null as "unknown" causes a number of hard to understand consequences. For example, two fields both having null values are not considered to be equal. In fact, in relational database systems, a value of NULL is not considered to be greater than, less than, different than, or equivalent to any other value, including another value of NULL.

In the architecture of the present invention, because null typically means all blanks, a completely blank field is forced to null before being written to the database. Similarly, if a field that is all blanks is retrieved from the database, its value is set to null ('\0'). Note that this handling can be circumvented using the Command Processor's direct issue a relational SQL INSERT or UPDATE. (However, it is recommended that no distinction be made between null and all blank.)

Blank padded comparison semantics is enforced. This means that two values that differ only in the number of trailing blanks are considered equal. For example, the string, 'a' is equivalent to 'a'. Ideally, null values would always collate like blanks, at the beginning, before other alphanumeric characters. The Base One database library provides programmers with a function, IsNullLoVal( ), which can be called to determine how nulls collate for the current database system.

Conceptually, the architecture of the present invention typically considers all character fields to be variable length. That is, the database field length specified in the data dictionary is a maximum length. Practically, to avoid application programmers having to code differently for fixed length versus variable length fields, the architecture assumes that all fields up to 254 characters in length should be stored using data types that the RDBMS considers to be fixed length. The data for these fields is automatically padded on the right with spaces before being stored in the database. For character fields larger than this (maximum of 1975), the architecture assumes the RDBMS should store the data in variable length fields. The architecture of the present invention is envisioned to always automatically trim trailing white space from these long, variable length fields.

The Database Field Dictionary specifies whether a field can be null. The check for null is made on the client side whenever possible. If the field is not allowed to be null, then it is also not allowed to be blank.

The INSERT command is used to add records in relational systems, whereas the functions of the present invention are typically AddRec( ), AddSet( ) and LoadRecs( ). In relational databases, you use UPDATE to change the contents of a record. The function of the present invention typically is ChgRec( ). DELETE is used in relational systems, and DelRec( ) and DelSet( ) functions preferably exist in the architecture of the present invention for deleting records. In addition to providing such easy-to-use functions, the Database subsystem provides direct access to SQL INSERT, UPDATE and DELETE commands through its Command Processor.

Transaction processing in relational systems requires explicit COMMIT and ROLLBACK commands. Not only are these supported, but most data modification functions of the present invention, such as AddRec( ), ChgRec( ), and DelRec( ), provide transaction processing options which simplify programming and improve performance. For example, AddRec( ) can be called with no arguments, and the default will be to commit on success and rollback on failure. This is important for client/server programming and three-tier Internet architecture where the middle tier can do the commits or rollbacks without going back to the client workstation for instructions. Explicit COMMIT or ROLLBACK commands are also supported.

When a query is first executed in the present invention, data is typically always returned without an explicit command, such as FETCH, which is required for most relational database implementations. Similarly., as a program moves through a result set, rows of data are also automatically moved into memory without the programmer keeping track of the buffer size and explicitly fetching the next block of results.

The architecture of the present invention is typically different from that of relational database architecture with respect to indexing. The architecture of the present invention preferably assumes that indexing is of primary concern to programmers and that the orderings that can be handled efficiently are an essential property of the database. The functions for data retrieval provide the programmer with a unique way to automatically insure that the retrieval is done through an appropriate index key rather than permitting the database to sort large numbers of records. This simplifies programming, helps guarantee good performance during scrolling, and greatly reduces the need for custom tuning to achieve acceptable response time.

Thus the several aforementioned objects and advantages are most effectively attained. Although a single preferred embodiment of the invention has been disclosed and described in detail herein, it should be understood that this invention is in no sense limited thereby.

What is claimed is:

1. A method of distributed batch processing wherein a plurality of substantially independent tasks access a common database, wherein commits are implemented during the execution of said independent tasks thereby allowing for subsequent recovery if errors occur during execution of any of said plurality of substantially independent tasks, wherein said method includes an inactive state, a wait state, a checking state, a running state and a commit state.

2. The method of distributed batch processing of claim 1 further including a facility for modifying the database descriptions of said independent tasks so that they move from said inactive state to said wait state to await processing.

3. The method of distributed batch processing of claim 2 wherein a batch job manager moves said independent tasks from said wait state to said checking state to determine if said independent tasks are ready for execution.

4. The method of distributed batch processing of claim 3 wherein said independent tasks can be moved from said checking state to said waiting state in order to delay execution, said independent tasks can be moved from said checking state to said inactive state to cancel execution, and can be moved from said checking state to said running state in order to execute said independent tasks.

5. The method of distributed batch processing of claim 4 wherein said independent task is moved from said running state to said inactive state if an error is detected during execution of said independent task.

6. The method of distributed batch processing of claim 5 wherein said common database is updated upon completion of said independent task without detection of an error.

7. The method of distributed batch processing of claim 1 wherein each of said substantially independent tasks consists of a single batch function and a list of parameters to be applied to said function.

8. The method of distributed batch processing of claim 7 including a batch job manager which runs said batch function and throws an exception if an error occurs during execution.

9. The method of distributed batch processing of claim 8 further including a batch job manager which translates said exception to an error code.

10. The method of distributed batch processing of claim 9 wherein said error code is displayed to a user and logged to a file.

11. The method of distributed batch processing of claim 10 wherein the distributed computing application program is independent of the database interface provided by a database vendor.

12. The method of distributed batch processing of claim 11 wherein the data path between the distributed computing application and the coordinating database is a TCP/IP connection.

13. The method of distributed batch processing of claim 12 wherein said distributed computing application creates a single communication, from a plurality of database calls, for transmission to a remote server that is local to the coordinating database and which executes said plurality of database calls.

* * * * *